United States Patent [19]

Miyadera

[11] Patent Number: 5,132,825
[45] Date of Patent: Jul. 21, 1992

[54] IMAGE PROCESSING APPARATUS HAVING CONTROL MEANS FOR ADJUSTING THE COLOR TEMPERATURE OF THE DISPLAYED IMAGE

[75] Inventor: Shunichi Miyadera, Tokyo, Japan

[73] Assignee: Asahi Kogaku Kogyo Kabushiki Kaisha, Tokyo, Japan

[21] Appl. No.: 658,704

[22] Filed: Feb. 21, 1991

Related U.S. Application Data

[63] Continuation-in-part of Ser. No. 598,377, Oct. 16, 1990.

[30] Foreign Application Priority Data

| Oct. 18, 1989 | [JP] | Japan | 1-272035 |
| Feb. 22, 1990 | [JP] | Japan | 2-42190 |
| Aug. 28, 1990 | [JP] | Japan | 2-225960 |

[51] Int. Cl.$^5$ .............................................. G02F 1/13
[52] U.S. Cl. .............................. 359/85; 359/86; 358/29
[58] Field of Search .............. 350/332, 345, 331 R, 350/334; 362/26, 29, 167, 226, 372; 340/784, 713, 719; 359/85, 86; 354/464, 483; 358/28, 29, 209

[56] References Cited

U.S. PATENT DOCUMENTS

| 3,783,765 | 1/1974 | Uno et al. | 95/42 |
| 4,242,679 | 12/1980 | Morozumi et al. | 350/331 T X |
| 4,555,170 | 11/1985 | Wakui et al. | 354/470 |
| 4,560,264 | 12/1985 | Kitazawa et al. | 354/219 |
| 4,760,389 | 7/1988 | Aoki et al. | 340/719 |
| 4,917,469 | 4/1990 | Ross | 350/332 |
| 4,919,520 | 4/1990 | Okada et al. | 350/331 T |
| 5,029,982 | 7/1991 | Nash | 350/331 T |

FOREIGN PATENT DOCUMENTS

| 62-14624 | 1/1987 | Japan | 350/345 |
| 63-296571 | 2/1988 | Japan | |

OTHER PUBLICATIONS

W. J. Smith, "Modern Optical Engineering", McGraw Hill Book Company, 1966, p. 198.

Primary Examiner—Stanley D. Miller
Assistant Examiner—Huy K. Mai
Attorney, Agent, or Firm—Sandler, Greenblum & Bernstein

[57] ABSTRACT

In an image processing apparatus employing a liquid crystal display, a light source is provided. The light emitted from the light source and external light are selectively utilized as the back light of the liquid crystal display. A driving circuit receives an image signal and outputs a drive signal, in accordance with the white balance of the light source. A white balance sensor is further provided in the image processing apparatus. When the external light is used as the back light, the drive signal to be supplied to the liquid crystal display is compensated so that the hue of the displayed image becomes optimum.

17 Claims, 11 Drawing Sheets

IMAGE PROCESSING APPARATUS HAVING CONTROL MEANS FOR ADJUSTING THE COLOR TEMPERATURE OF THE DISPLAYED IMAGE

CROSS-REFERENCE TO RELATED APPLICATION

This application is a continuation-in-part of application Ser. No. 07/598,377, filed Oct. 16, 1990, which is incorporated herein by reference in its entirety.

BACKGROUND OF THE INVENTION

This invention relates to a displaying device such as an LCD (Liquid Crystal Display) View Finder applicable to a video camera, an electronic still camera and the like.

Figure 1A:
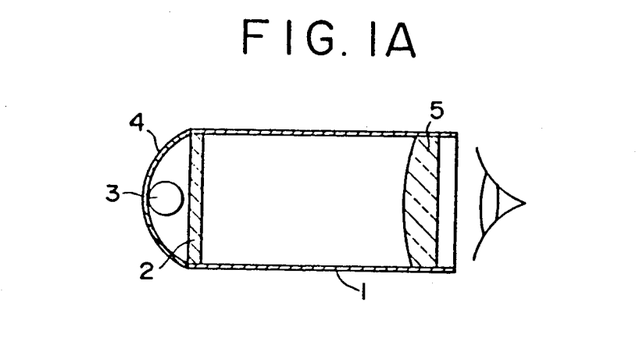
FIGS. 1A through 1C show schematic sectional views of prior art LCD viewer finders.

FIG. 1A shows a schematic sectional view of a conventional LCD view finder.

On the left hand side end of a casing 1, an LCD 2 is arranged. On the opposing right hand side of the casing 1, is provided a lens 5 through which an image displayed on the LCD 2 can be monitored. A light source 3 is disposed behind (left hand side in FIG. 1A) the LCD 2, and a reflection plate 4 is disposed behind the light source 3. The light emitted from the light source 3 is, directly or by way of the reflection plate 4, projected on the back surface of the LCD 2. As constructed above, the image displayed on the LCD 2 becomes relatively easy to see through the lens 5.

Figure 1B:
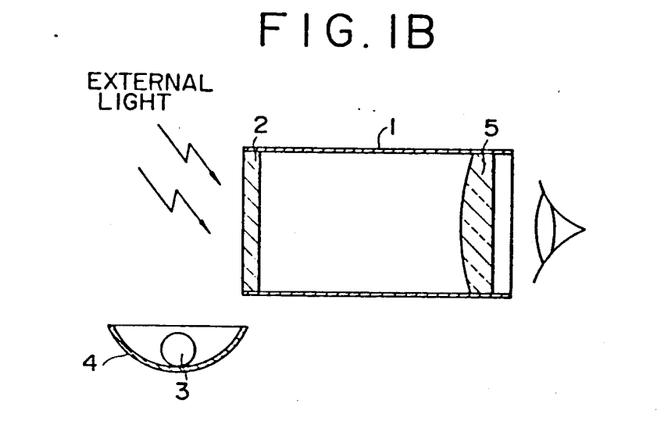
Figure 1C:
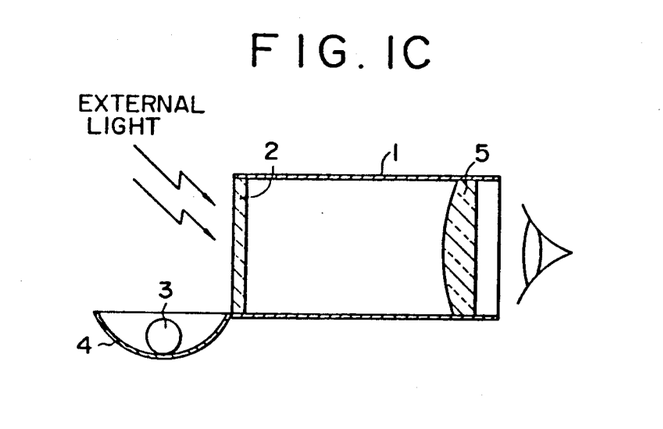

When an external light source is used in the conventional type LCD view finder, the inner light sources 3 and the reflection plate 4 are removed from the casing 1, as shown in FIG. 1B, in order to project the light from the external light source onto the back surface of the LCD 2. Alternatively, as shown in FIG. 1C, the reflection plate 4 is made rockable, with respect to the casing 1, together with the inner light sources 3.

Figure 2:
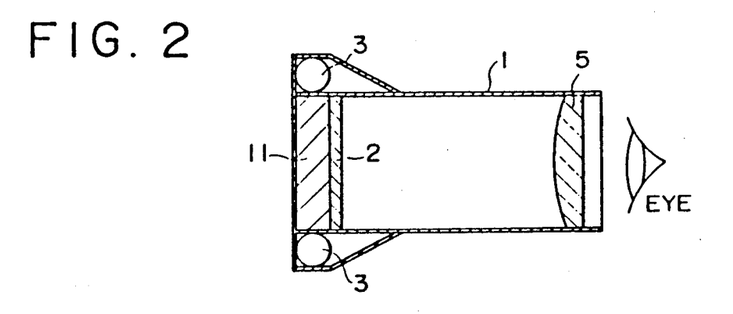
FIG. 2 show a schematic sectional view of another prior art LCD view finder.

FIG. 2 shows another example of prior art relating to LCD view finders. In FIG. 2, the elements corresponding to those in FIG. 1 are provided with the same reference numerals as in FIG. 1. In this device, a light transmitting member 11 is provided behind the LCD 2, and light sources 3, are provided an opposing sides of the peripheral surface of the light transmitting member 11. Thus constructed, the light transmitting member 11 transmits the light emitted from the light sources 3, to project the light onto the back surface of the LCD 2.

When the external light source is employed in this device, the light sources 3, are removed from the casing 1.

As stated above, in the conventional LCD view finders, the inner light sources 3 should be made removable or rockable, with respect to the casing 1 in order to employ the external light source. The problem resides in that an operator has to bring the removed light source with him, or prepare a place to position the removed light source while the external light source is used. In a case in which the reflection plate is made rockable, the space required for the rockable reflection plate in a relatively large device.

SUMMARY OF THE INVENTION

It is therefore an object of the present invention to provide an improved image processing appratus utilizing a displaying device, such as a view finer, capable of using external light as well as light emitted from an inner light source as a back light without requiring a wide space therefor. The displaying device is capable of obtaining an image having an optimum hue regardless of the color temperature of the back light.

For the above object, there is provided an image processing apparatus capable of receiving an image signal and displaying an optical image. The apparatus comprises a liquid crystal display that utilizes a back light for illuminating the back surface thereof. The apparatus further comprises:

sensor device for detecting the white balance of the back light;

drive device for outputting the drive signal to the liquid crystal display, based on the received image signal; and control device for adjusting the drive signal to be supplied to the liquid crystal display in accordance with the white balance detected by said sensor device.

In another aspect of the invention, there is provided an image processing apparatus capable of receiving an image signal and displaying an optical image corresponding thereto, comprising:

a liquid crystal display for displaying the optical image, the liquid crystal display being actuated when a drive signal is supplied;

a light source;

an illuminating member having at least two light receiving portions for respectively receiving external light and light emitted by the light source, an illuminating surface of the illuminating member is arranged to face the back surface of the liquid crystal display for illuminating the liquid crystal display from behind;

a casing for accommodating the liquid crystal display the light source and the illuminating member therein;

Selection device for causing the illuminating member to selectively receive external light or light emitted by the light source;

detecting device for detecting which one of the lights emitted from the light source and the external light is selected by the selection device;

sensor device for detecting the white balance of the external light;

drive device for outputting the drive signal to the liquid crystal display based on the received image signal; and control device for adjusting the drive signal to be supplied to the liquid crystal display based on the white balance detected by the sensor device when the detecting device detects that the external light is used as the back light.

DESCRIPTION OF THE EMBODIMENTS

FIGS. 3 through 6 show a LCD view finder embodying the present invention.

An LCD 22 is disposed at the left hand side of a casing 21. An image displayed on the LCD 22 is monitored from the right hand side of the casing 21 through a lens 29 which is disposed at the right hand side end of the casing 21. A lever 23 is rotatably supported from a center pivot point. Shutters 24 and 25 are connected to the ends of the lever 23, respectively. A switching knob 26, provided on the center portion of the lever is operated to switch the shutters 24 and 25. Protrusions 24a, extending toward the casing 21 are provided at either end of the shutter 24. On the upper surface of the casing 21, grooves 21a, are formed to engaged with the protrusions 24a, respectively. Behind the LCD 22 (left hand side of the LCD in FIG. 3), a light transmitting member 27 is provided. An inner light source 28, such as a lamp, fluorescent lamp or the like, is arranged below the light transmitting member 27.

Figure 3:
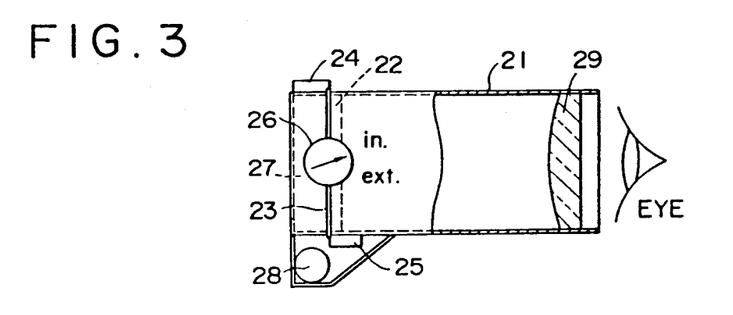
FIG. 3 shows a schematic sectional side view of an LCD view finder using an inner light source, which is an embodiment of the present invention.
Figure 4:
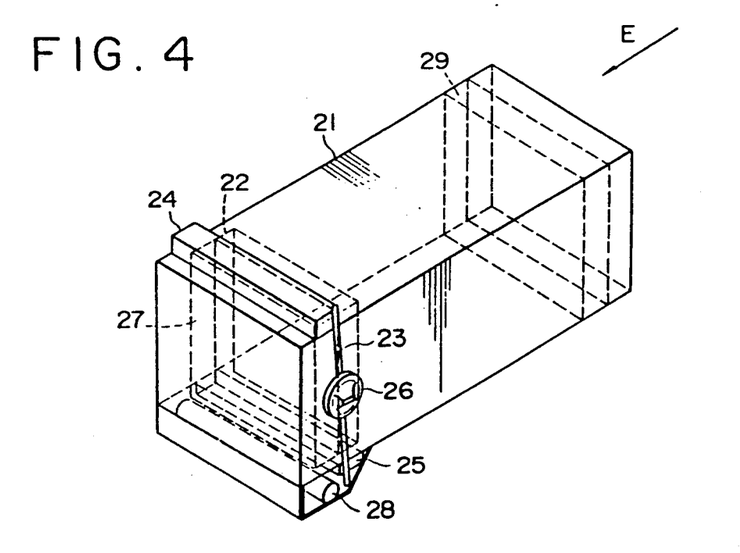
FIG. 4 shows a perspective view of the LCD view finder, shown in FIG. 3.

In FIGS. 3 and 4, the switching knob 26 is turned to indicate the inner light source position ("in". position). In this position, the shutter 24 covers the upper peripheral surface of the light transmitting member 27, while the lower peripheral surface of the light transmitting member 27 is exposed to the light from the inner light source 28.

The light emitted from the inner light source is incident to the lower peripheral surface of the light transmitting member 27. The light transmitting member 27 then transmits the light to the back surface of the LCD 22. Since the lower surface of the shutter 24 (the surface of the shutter 24 facing the upper peripheral surface of the light transmitting member 27) is formed to reflect light, the light passed through the light transmitting member 27 is reflected on the lower surface of the shutter 24 and directed towards the back surface of the LCD 22. Thus the back surface of the LCD 22 is illuminated and the image displayed on the LCD 22 can be monitored in the direction E shown in FIG. 4. It should be noted that when the light emitted from the light source 28 is projected onto the back surface of the LCD 22, through the light transmitting member 27, external light directed to the upper peripheral surface of the light transmitting member 27 is shielded by the shutter 24.

Figure 5:
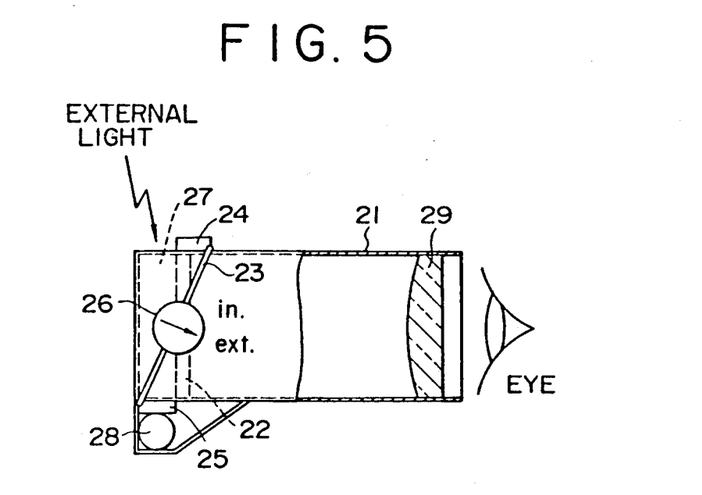
FIG. 5 shows a schematic sectional view of the LCD view finder using external light.
Figure 6:
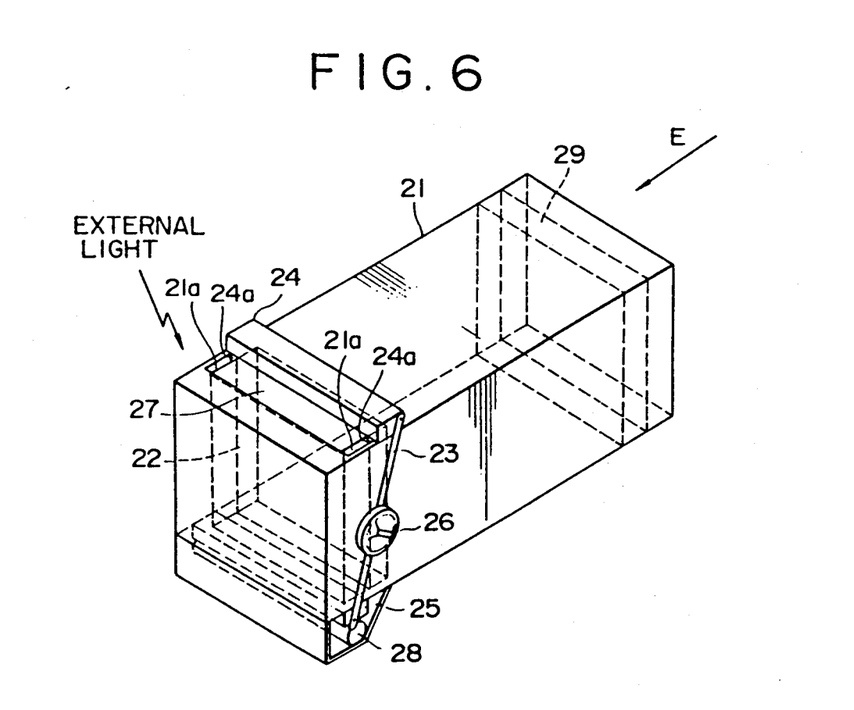
FIG. 6 shows a perspective view of the LCD view finder using external light.

As shown in FIGS. 5 and 6, when the switching knob 26 is turned clockwise from the position indicating the inner light source 28 to the position indicating the external light ("ext." position), the lever 23 is correspondingly turned clockwise. This causes the shutter 24 to be driven to slide to the right in FIG. 5, while the shutter 25 is driven to slide to the left, whereby the upper peripheral surface of the light transmitting member 27 is exposed to the external light and the lower peripheral surface of the light transmitting member 27 is covered by the shutter 25. In this case, the sliding movement of the shutter 24 is smoothly executed with the protrusions 24a, being guided by the grooves 21a. It should be noted that the protrusions are provided only on the shutter 24 in this embodiment, it is possible to provide protrusions on the shutter 25, and grooves to engage them on the lower surface of the casing 21.

The light emitted by the inner light source 28 does not enter the light transmitting member 27 as the shutter 25 is located between the inner light source 28 and the lower surface of the light transmitting member 27.

The upper peripheral surface of the light transmitting member 27 is now exposed to the external light. The external light is transmitted by the light transmitting member 27 and projected onto the back surface of the LCD 22. The light passing through the light transmitting member 27 and reaching the lower peripheral surface of the light transmitting member 27 is reflected by the upper surface of the shutter 25 which is formed to reflect light.

As constructed above, either the external light or the light from the inner light source 28 is selectively projected on the back surface of the LCD 22 by the light transmitting member 27, which makes it easy to monitor the image displayed on the LCD 22 from the right hand side of the view finder through the lens 29 in the direction E shown in FIG. 6.

Figure 7:
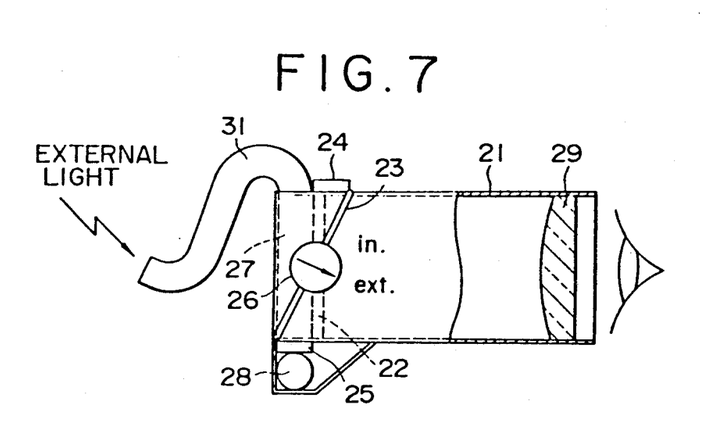
FIG. 7 shows a schematic sectional side view of a modified embodiment.
Figure 8:
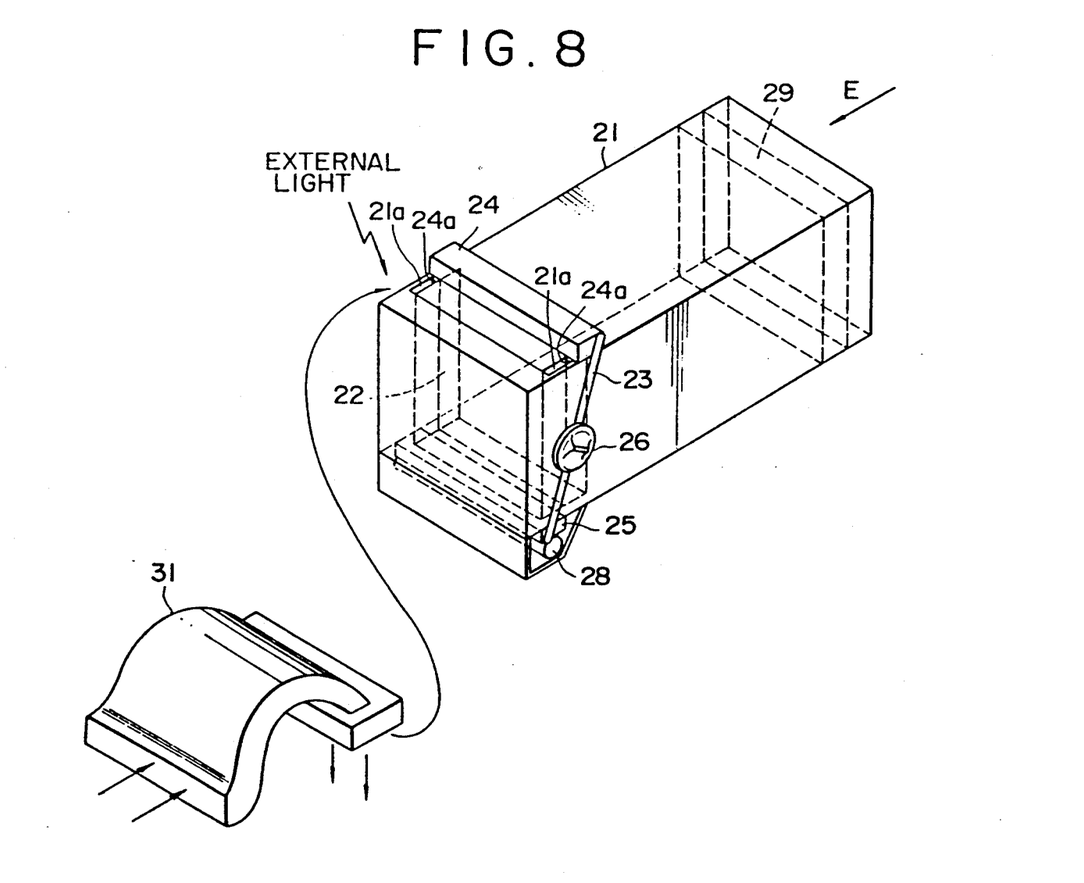
FIG. 8 shows a perspective view of the modified embodiment, shown in FIG. 7.

FIGS. 7 and 8 show a modification of the LCD view finder according to the present invention. In FIGS. 7 and 8, the same numerals as in FIGS. 3 through 6 represent the same elements of the device.

In this modification, an optical fiber member 31 is employed with one end thereof being connected to the upper surface of the light transmitting member 27. The external light is introduced to the upper peripheral surface of the light transmitting member 27 by the optical fiber member 31. The other elements of the device are the same as those shown in FIGS. 3 through 6. Also with this modification, the external light can be transmitted through the light transmitting member 27 onto the back surface of the LCD 22 as well as the light emitted from the inner light source 28. Thus the image can be readily monitored in the direction E shown in FIG. 8.

Figure 9:
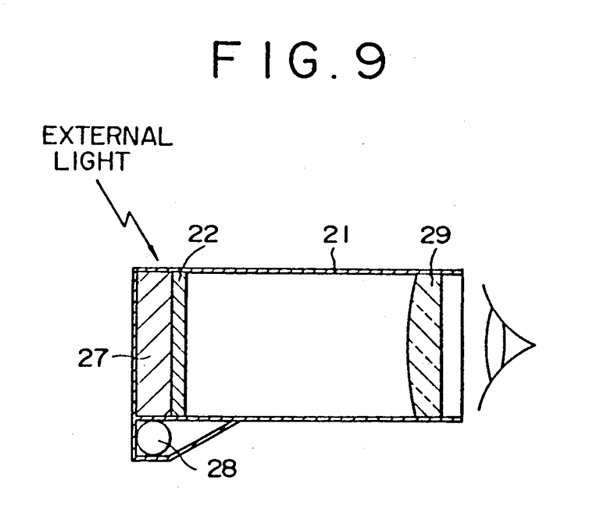
FIG. 9 shows a schematic sectional side view of a second embodiment of the invention.

FIG. 9 shows another modification of the LCD view finder according to the present invention. In this modification, the same numerals as in FIGS. 3 through 8 represent the same elements of the device.

In this modification, the shutters 24, 25, the lever 23, and the switching knob 26 are omitted from the device shown in FIGS. 3 through 6.

In this modification, since both the upper and lower peripheral surfaces of the light transmitting member 27 are uncovered the light, from both the inner light source 28 and the external light, is simultaneously transmitted by the light transmitting member 27 onto the back surface of the LCD 22.

Figure 10:
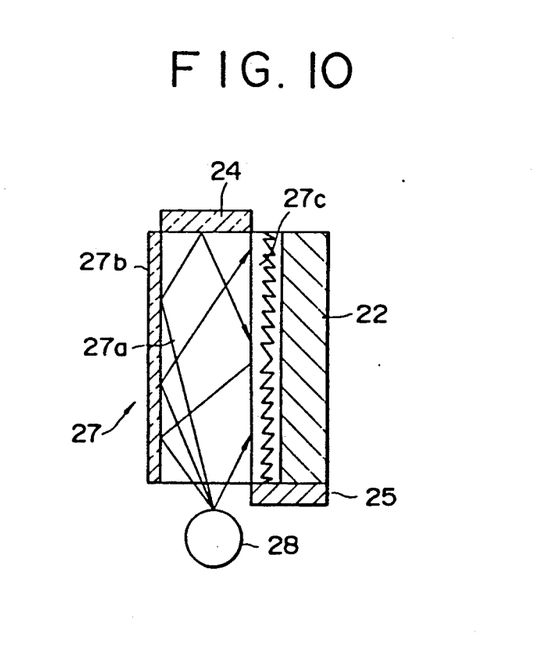
FIG. 10 shows a detailed construction of the light transmitting member.

FIG. 10 shows the detailed construction of the light transmitting member 27. The light transmitting member 27 comprises three layers; a light transmitting plate 27a, a reflection plate 27b and a light diffusion plate 27c with the reflection plate 27b and the light diffusion plate 27c being provided on the respective surface of the light transmitting plate 27a. The light transmitting plate 27a transmits the light from the inner light source 28 (or the external light) to the light diffusion plate 27c, the reflection plate 27B or the shutter 24 (or shutter 25). The light reflected by the reflection plate 27b, or the shutter 24 (or the shutter 25) is transmitted by the light transmitting plate 27a again and directed toward the light diffusion plate 27c. The light diffusion plate 27c has a plurality of fine protrusions, each of which has a triangular sectional surface, on the LCD-side surface (the right hand side surface in FIG. 10). The light entering the light diffusion plate 27c is equally diffused and projected to the back surface of the LCD 22.

As stated above, with the LCD view finder according to the invention, the light from the inner light source and the external light is simultaneously or selectively received by the light transmitting member and transmitted to the back surface of the LCD, thereby the operability becomes improved and the external light can be readily used.

Figure 11:
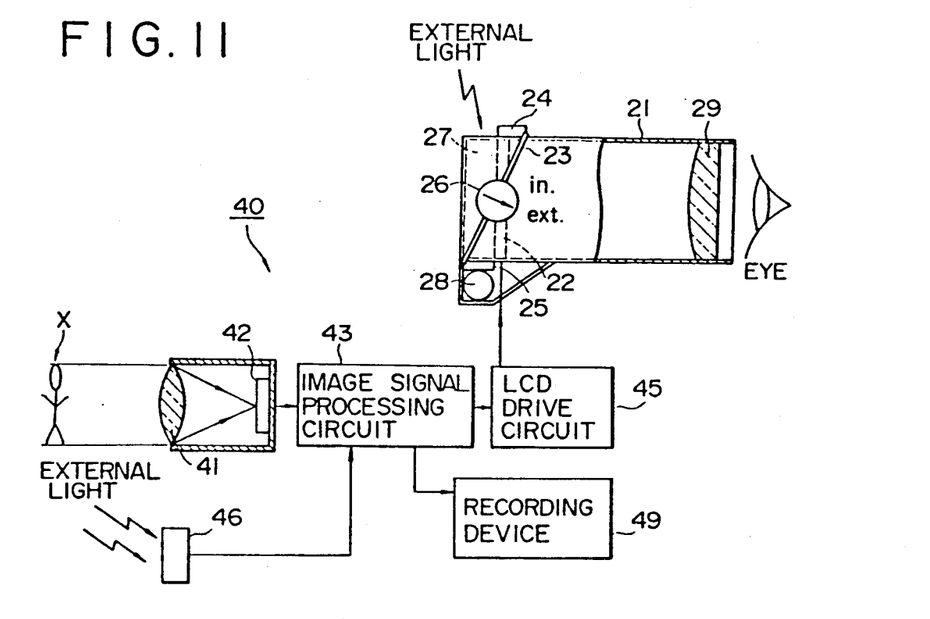
FIG. 11 shows an example of an image processing apparatus employing a view finder according to the present invention.

FIG. 11 shows an example of an image processing apparatus 40 employing an LCD view finder described above. In FIG. 11, an objective X is optically image-formed on an image sensor 42 through a photographing lens 41, which is photoelectrically converted into an electric image signal therein. The image signal obtained in the image sensor 42 is supplied to an image signal processing circuit 43. This image signal processing circuit 43 also receives a white balance signal from a white balance sensor 46.

The image signal processing circuit 43 adjusts the color temperature of the image signal obtained in the image sensor 42 in accordance with the white balance signal supplied from the white balance sensor 46, and then outputs and adjusted signal to a recording device 49. The adjusted image signal is simultaneously transmitted to an LCD drive circuit 45. The LCD drive circuit 45 outputs a drive signal to an LCD (liquid crystal display) 22 based on the adjusted image signal supplied from the image signal processing circuit 43.

As aforementioned, the view finder is capable of using either external light or internal light as a light source. The color temperature of the internal light is determined in accordance with the LCD to be used. In this embodiment, it is set to about 8000° K. Alternatively, when external light is used as the back light, the color temperature is about 5200° K. in the daytime and outside. If it is cloudy, the color temperature becomes 7000° K. Since the color temperature of the inner light source 28 is set so that the hue of the image displayed on the LCD is optimum when the inner light source is used as the back light, if the color temperature of the back light is changed, a person who monitors the displayed image feels that the hue of the displayed image is changed.

Figure 12:
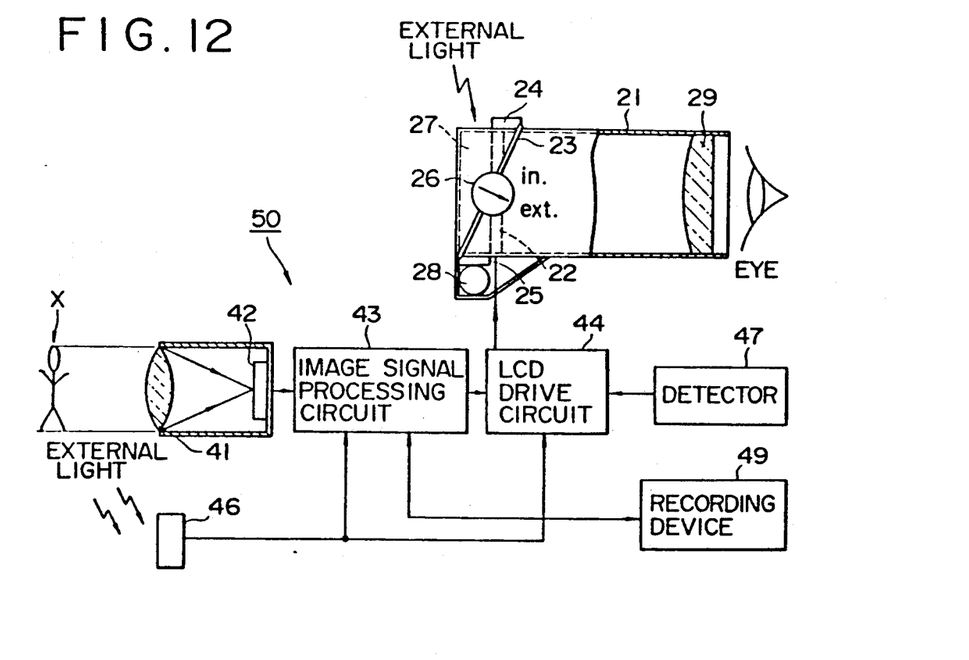
FIG. 12 is a modified image processing apparatus.

FIG. 12 shows a modified image processing apparatus 50, embodying the present invention, which is intended to overcome the change of the hue of the displayed image on the LCD, due to the change of the color temperature of the back light when external light is used.

In FIG. 12, an LCD drive circuit 44 neutrally drives the LCD 22 in accordance with the color temperature of the internal light source 28. A detector 47 detects which one of the lights emitted by either the internal light source 28 or the external light is used as the back light, by detecting the movement of the lever 23 or switching knob 26. When the detector 47 detects that the external light is used as the back light, the LCD drive circuit 44 drives the LCD 22 based on the white balance signal outputted from the white balance sensor 46. The white balance signal is also supplied to the image signal processing circuit 43 as the image processing apparatus 40 shown in FIG. 11.

When the lever 23 is positioned for the use of the internal light source 28, the detector 47 detects that the internal light source is used as the back light. In this case, the white balance signal outputted from the white balance sensor 46 is not used for adjusting the image signal supplied to the LCD 22. Accordingly, the LCD drive circuit 44 actuates the LCD 22, based on the color temperature of the internal light source 28.

On the other hand, when the lever 23 is positioned for the use of the external light, detector 47 detects that external light is used as the back light. Accordingly, the LCD drive circuit 44 drives the LCD 22, based on the white balance signal outputted from the white balance sensor 46. In other words, the LCD drive circuit 44 actuates the LCD 22 in accordance with the color temperature of the external light; i.e. the external light illuminating the light transmitting member 27, with the color temperature being detected by the white balance sensor 46. Namely, the color temperature of the image signal obtained in the image sensor 42 is modified or adjusted in accordance with the white balance signal outputted from the white balance sensor 46 to drive the LCD 22. Thus, the LCD 22 is driven in accordance with the optimum color temperature so as to provide the image having an optimum hue required for the monitor.

Figure 13:
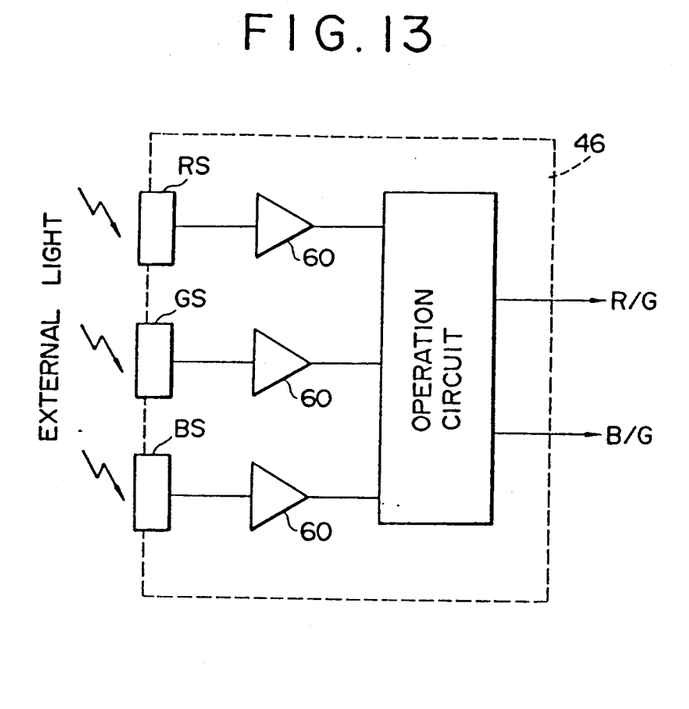
FIG. 13 is a block diagram of a white balance sensor.

FIG. 13 illustrates the signal processing executed in the white balance sensor 46. In the white balance sensor 46, the external light is received by sensors RS, GS and BS through red, green and blue filters, respectively. The light amount of each of the light, respectively received through the red, green and blue filters, is then logarithmically compressed by logarithmic compressing circuits 60, 60, and 60. The compressed red(R), green(G), and blue (B) signals are outputted in the form of R/G, and B/G through an operation circuit 61.

Figure 14:
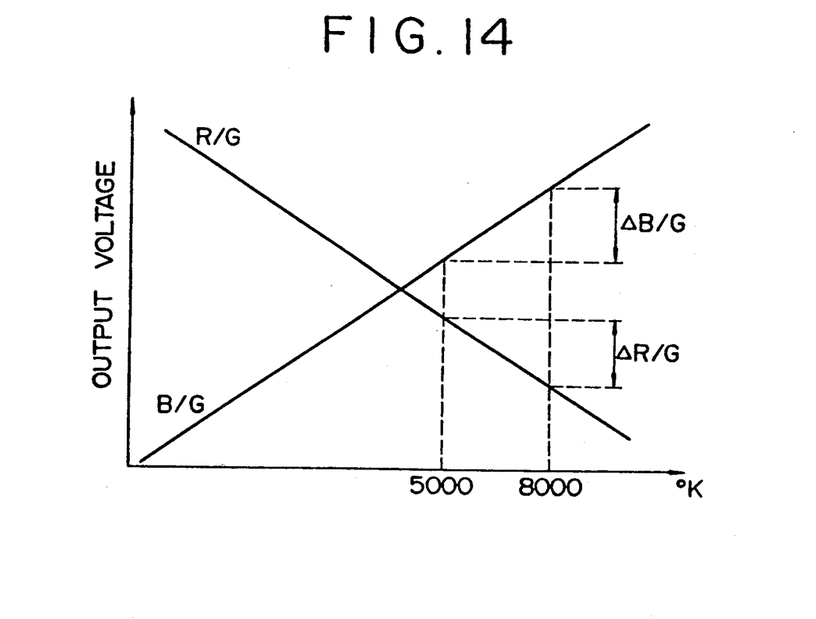
FIG. 14 is a graph showing correlation between color temperature and both output voltages R/G and B/G from the white balance sensor.

FIG. 14 is a graph showing the relation between the color temperature and both the output voltages R/G and B/G. As shown in FIG. 14, at the point where the color temperature is 5000° K., the output voltage R/G is greater than that at the point where the color temperature is 8000° K. by $\Delta R/G$. The output voltage B/G is smaller than that at the point where the color temperature is 8000° K. by $\Delta B/G$. Accordingly, the displayed image becomes more reddish when the temperature is 5000° K. than that when the temperature is 8000° K., if the signal supplied to the LCD 22 is not adjusted in accordance with the color temperature of the back light.

In this case, if the output voltage R/G, and B/G, at the point where the color temperature is 5000° K., is decreased by $\Delta R/G$ and increased by $\Delta B/G$, respectively, the hue of the displayed image, when the color temperature of the back light is 5000° K., becomes the same as that when the color temperature of the back light is 8000° K.

Figure 15:
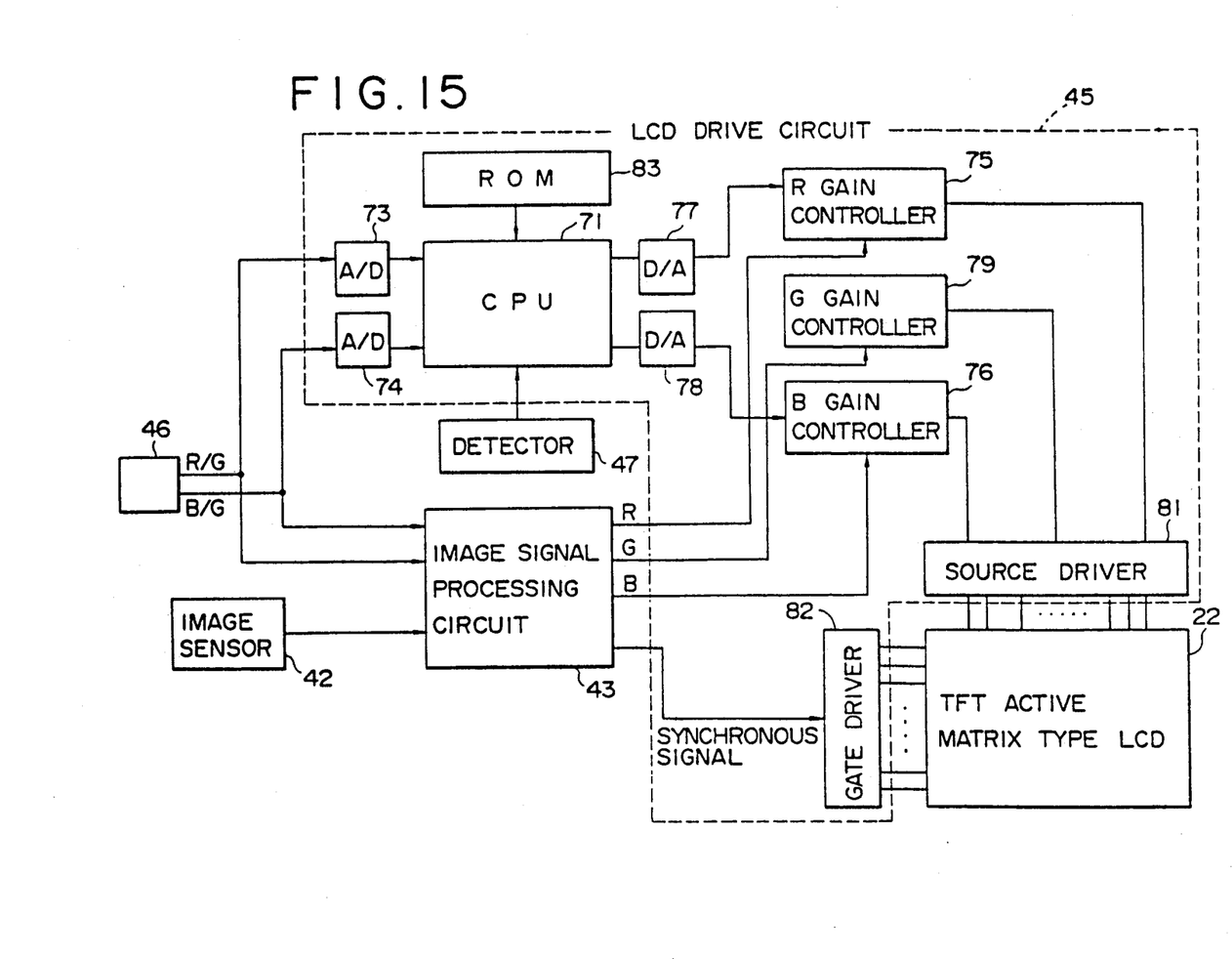
FIG. 15 is a block diagram of the image processing apparatus.

FIG. 15 is a block diagram showing the image processing apparatus, in which the signal supplied to the LCD 22 is compensated in accordance with the color temperature, as explained above.

The outputted signals R/G and B/G are converted into digital signal by A/D converters 73 and 74, respectively, and supplied to a CPU 71. In the CPU 71, the compensation values ΔR/G and ΔB/G are determined with reference to the data stored in a ROM (Read Only Memory) 83, then supplied to an R gain controller 75 and a B gain controller 76 after being converted into analog signals by D/A converters 77 and 78, respectively. To the R gain controller 75, to the B gain controller 76 and to a G gain controller 79, the R, B, G signal outputted from the image processing circuit is supplied respectively.

The signal processed by the R gain controller 75, the B gain controller 76, and the G gain controller 79 are supplied to a source driver 81. Simultaneously, the synchronous signal outputted from the image processing circuit 43 is supplied to the gate driver 82. Thus, the LCD 22 is driven with the drive signal, which color temperature is adjusted, in accordance with the white balance signal outputted by the white balance sensor 46. It should be noted that the gain of the R and B gain controllers vary in accordance with the white balance signal, and that of G gain controller is set to a predetermined fixed value.

The LCD 22 is a well-known TFT (thin film transistor) Active Matrix type LCD. The gate driver 82 outputs a scanning pulse in response to the synchronous signal transmitted from the image processing circuit 43. Respective elements of the TFT Active Matrix Type LCD are actuated in accordance with the scanning pulse, therefore, the image corresponding to the R, G, and B signals supplied from the source driver 81, is displayed.

Figure 16:
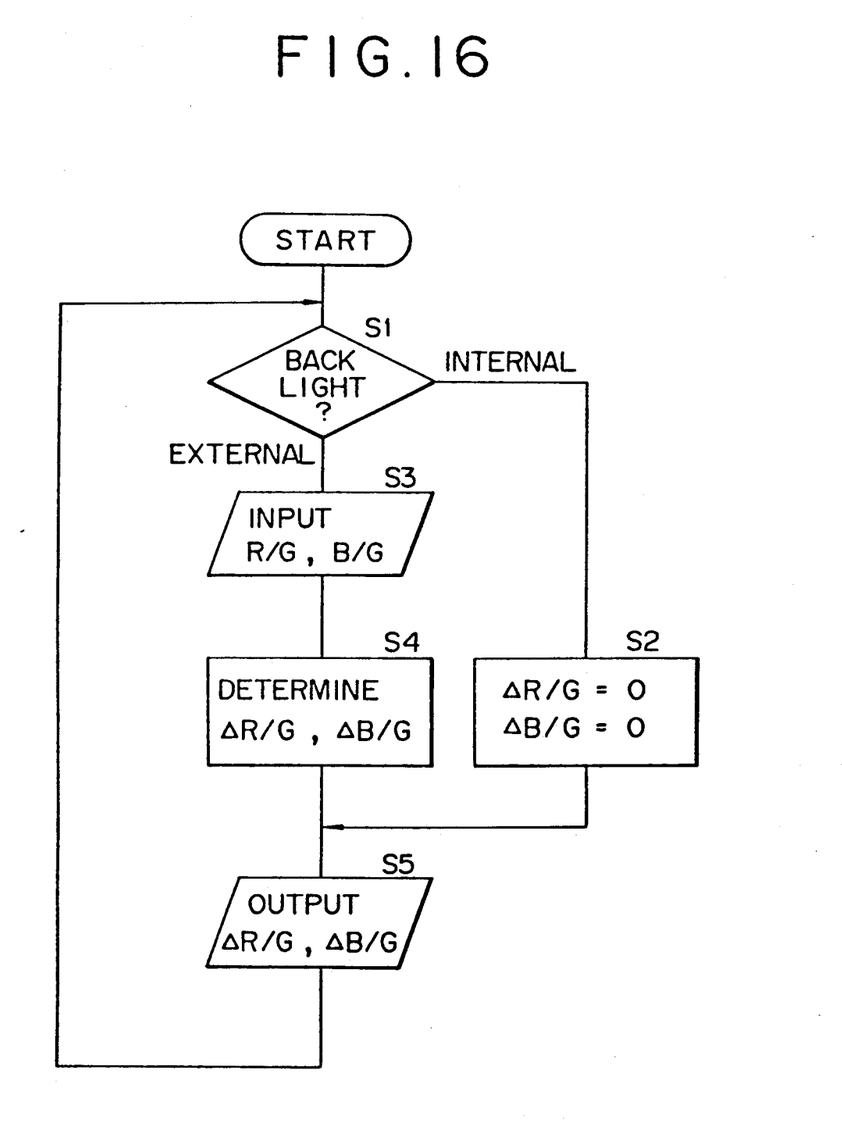
FIG. 16 is a flowchart illustrating the processing executed in the CPU of the image processing apparatus.

FIG. 16 shows a flowchart illustrating the procedure for determining the compensation values ΔR/G and ΔB/G. In the figure, it is examined in step S1 whether the internal light or external light is used as the back light. If the detector 47 detects that the internal light source 28 is used as a back light, the compensation values ΔR/G and ΔB/G are set to "0" in step S2. If the detector 47 detects that external light is used as a back light, the A/D-converted output voltage R/G and B/G is transmitted from the A/D converters 73 and 74, respectively, as in step S3. In step S4, the compensation values ΔR/G and ΔB/G are determined from a table stored in the ROM 83, based on the inputted data R/G and B/G. In the table stored in the ROM 83, the relation between R/G, B/G and ΔR/G, and ΔB/G is described. Then, in step S5, the compensation values ΔR/G and ΔB/G are outputted to the D/A converters 77 and 78, respectively.

Figure 17:
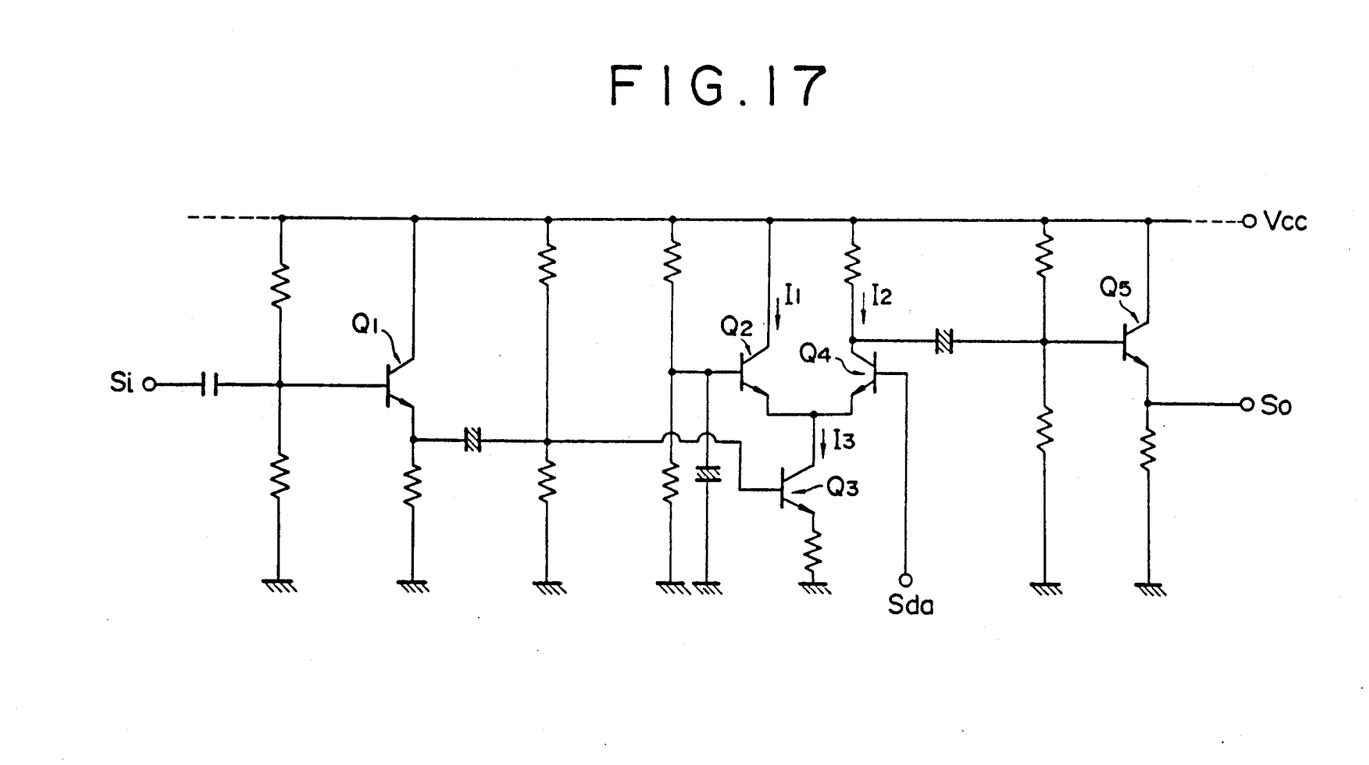
FIG. 17 shows an example of a gain control circuit.

FIG. 17 is an example of a gain control circuit employed in gain controller 75 and 76. In FIG. 17, a transistor $Q_1$ is used for an input buffer, and a transistor $Q_5$ is used as an output buffer. In the case of a R/G signal, as shown in FIG. 15, the compensation value ΔR/G is supplied to the D/A converter 75. Then, the outputted voltage from the D/A converter 75 is supplied to a terminal Sda in FIG. 17. The R-signal outputted from the image processing circuit 43 is supplied to a terminal Si. In this circuit, the relation between the collector current $I_1$ of a transistor $Q_2$, the collector current $I_2$ of a transistor $Q_4$, and the collector current $I_3$ of a transistor $Q_3$ is:

$$I_3 = I_1 + I_2$$

and further, the base voltage of the transistor $Q_2$ is constant. If the base voltage of the transistor $Q_4$ is raised, $I_1$ is decreased and $I_2$ is increased. Therefore, the gain of the R/G output voltage, which is outputted from a terminal So, is raised in accordance with the inputted compensation value ΔR/G. Similarly, in the case of B/G signal, the gain of the B/G output voltage is raised in accordance with the inputted compensation value ΔB/G.

Figure 18:
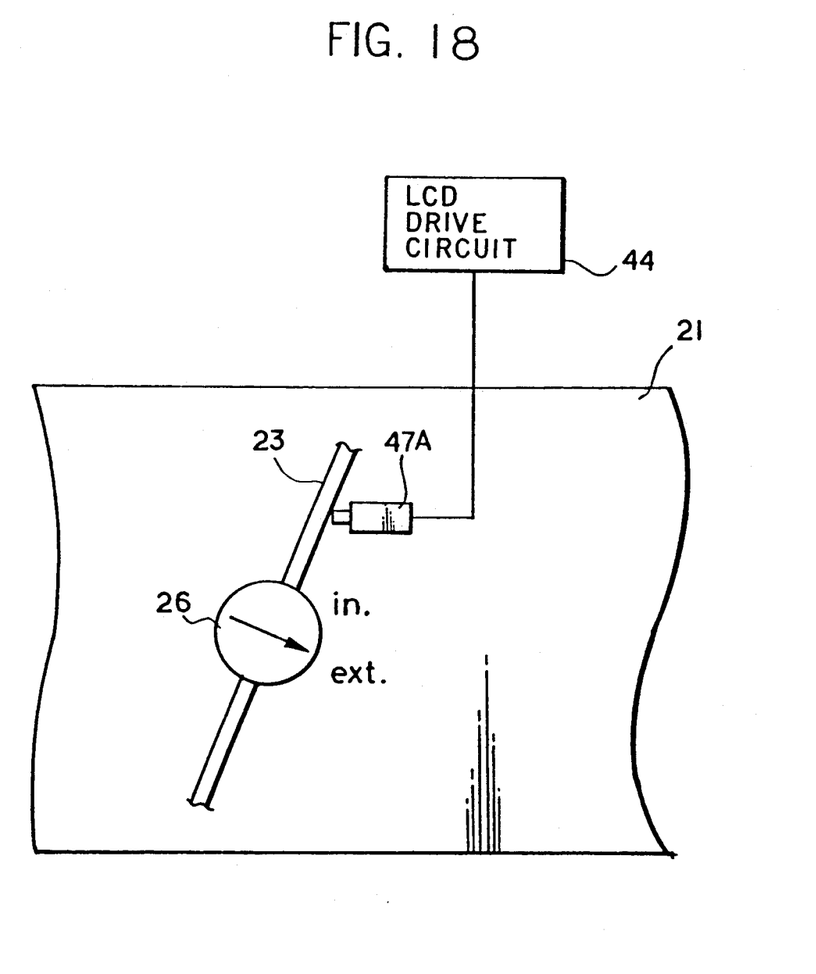
FIG. 18 shows an example of a detector.

FIG. 18 shows an example of the detector 47. In this example, a micro switch 47A is used as a detector. The micro switch is secured on the side wall of the casing 21. When the micro switch 47A is in ON condition, the lever 23 is positioned so that external light is used as the back light. When the micro switch 47A is in OFF condition, the lever 23 is positioned so that the light emitted from the internal light 28 is used as the back light. Thus the ON/OFF condition of the micro switch 47A corresponds to the position of the lever 23, i.e., to the light used as the back light. If external light is used as the back light, the micro switch is in the ON condition, thereby the drive signal to be supplied to the LCD 22 is compensated, as explained above, in accordance with the white balance signal outputted from the white balance sensor 46.

As above, the color temperature of the signal supplied to the LCD is adjusted based on the output signal of the white balance sensor, the hue of displayed image on the LCD becomes optimum. Further, the detect means is provided for detecting whether the internal light or external light is used for the back light of the LCD, and the hue of the displayed image is optimum regardless of whether the internal light or external light is used as a back light.

The present disclosure relates to subject matters contained in Japanese patent applications Nos. HEI 1-272035 (filed on Oct. 18, 1989), HEI 2-225960 (filed on Aug. 28, 1990), and HEI 2-42190 (filed on Feb. 22, 1990) which are expressly incorporated, herein by reference, in their entireties.

What is claimed is:

1. An image processing apparatus capable of receiving an image signal and displaying an optical image comprising a liquid crystal display, a back surface of said liquid crystal display being illuminated by a back light, said apparatus further comprising:
   sensor means for detecting the white balance of said back light;
   drive means for outputting a drive signal to said liquid crystal display based on the received image signal; and
   control means for adjusting the drive signal to be supplied to said liquid crystal display in accordance with the white balance detected by said sensor means in order to adjust the color temperature of the displayed image.

2. An image processing apparatus capable of receiving an image signal and displaying an optical image corresponding thereto, comprising:
   a liquid crystal display for displaying the optical image, said liquid crystal display being illuminated when a drive signal is supplied;
   a light source;

an illuminating member having at least two light receiving portions for respectively receiving external light and the light emitted by said light source, an illuminating surface of said illuminating member being arranged to face the back surface of said liquid crystal display for illuminating said liquid crystal display from behind;

a casing for accommodating said liquid crystal display, said light source, and said illuminating member therein;

select means for causing said illuminating member to selectively receive either external light or the light emitted by said light source;

detecting means for detecting which one of the lights emitted from either said light source or external light is selected by said select means;

sensor means for detecting the white balance of the external light;

drive means for outputting the drive signal to said liquid crystal display, based on the received image signal; and control means for adjusting the drive signal to be supplied to said liquid crystal display based on the white balance detected by said sensor means when said detecting means detects that external light is used as the back light in order to adjust the color temperature of the displayed image.

3. The image processing apparatus according to claim 2, wherein said drive means outputs the drive signal in accordance with the white balance of said light source.

4. The image processing apparatus according to claim 2, wherein said control means comprises a storing means for storing compensation data with respect to the white balance of said light source, and wherein said control means compensates the drive signal with reference to the data stored in said storing means, when said detecting means detects that external light is used as the back light.

5. The displaying device according to claim 2, wherein said light receiving portions are provided on the respective peripheral surfaces of said illuminating member; and wherein said casing includes openings at the portions corresponding to said respective light receiving portions.

6. The image processing apparatus according to claim 5, wherein the surfaces of said illuminating member other than said illuminating surface and said light receiving portions are covered with at least an inner surface of said casing, and wherein said surface of said casing, which covers said illuminating member is adapted to reflect light so that the light directed towards any direction is directed towards said illuminating surface.

7. The image processing apparatus according to claim 6, wherein said light receiving portions are provided on respective opposite peripheral surfaces of said illuminating member, and wherein said casing includes two openings corresponding to said respective light receiving portions on the opposite surfaces thereof.

8. The image processing apparatus according to claim 7, wherein the surfaces of said illuminating member other than said illuminating surface and said light receiving portions are covered with at least an inner surface of said casing, and wherein the surfaces of said casing which cover said illuminating member are adapted to reflect light so that the light directed towards any direction is directed towards said illuminating surface.

9. The image processing apparatus according to claim 8, further comprising select means for causing said light receiving portions to be selectively exposed to one of the external light and the light emitted by said light source.

10. The image processing apparatus according to claim 9, wherein said select means comprises:

shutter members for respectively covering said openings formed on said casing; and switching means for switching the opening on said casing to be covered by a respective one of said shutter members, whereby one of said openings is covered by a respective one of said shutter members while the other one of said openings is uncovered.

11. The image processing apparatus according to claim 10, wherein the surface of each of said shutter members which faces said light receiving portions is adapted to reflect light.

12. The image processing apparatus according to claim 10, wherein said switching means comprises an operating member for operating said shutter members to selectively close one of said openings.

13. The image processing apparatus according to claim 12, further comprising a light introducing member for introducing the external light to one of said light receiving portions, one end of said light introducing member being adapted to be exposed to external light, while the other end of said light introducing member being connectable to the opening corresponding to the other one of said light receiving portions.

14. The image processing apparatus according to claim 2, wherein said illuminating surface of said illuminating member is adapted to diffuse light.

15. An image processing apparatus comprising:

a liquid crystal display for displaying an optical image of an object, said liquid crystal display being capable of being illuminated by external light as a back light thereof;

optical means for forming an optical image of the object;

image receiving means for receiving and photoelectrically converting the optical image formed by said optical means;

sensor means for detecting the white balance of external light and outputting a white balance signal;

signal generating means for generating an image signal based on the photoelectrically converted optical image and the white balance signal;

drive means for outputting a drive signal to said liquid crystal display based on the image signal; and control means for adjusting the drive signal to be supplied to said liquid crystal display based on the white balance detected by said sensor means when external light is used as the back light in order to adjust the color temperature of the displayed image.

16. The image processing apparatus according to claim 15, which further comprises:

an inner light source;

switch means for switching the light to be used as the back light between the light emitted from said inner light source and external light;

detecting means for detecting which one of the light emitted by said inner lights and external light is used as the back light.

wherein said drive means outputs the drive signal in accordance with the white balance of said inner light source, and wherein said control means adjusts the drive signal when said detecting means detects that external light is used as the back light.

17. The image processing apparatus according to claim 16, wherein said control means comprises a storing means for storing compensation data with respect to the white balance of said light source, and wherein said control means compensates the drive signal, with reference to the data stored in said storing means, when said detecting means detects that external light is used as the back light.

* * * * *

UNITED STATES PATENT AND TRADEMARK OFFICE
CERTIFICATE OF CORRECTION

PATENT NO. : 5,132,825
DATED : July 21, 1992
INVENTOR(S) : S. MIYADERA

It is certified that error appears in the above-indentified patent and that said Letters Patent is hereby corrected as shown below:

At column 10, line 64 (claim 16, line 7) of the printed patent, change "light" to ---lights---.
At column 10, line 65 (claim 16, line 8) of the printed patent, change "lights" to ---light---.

Signed and Sealed this

Twenty-sixth Day of April, 1994

Attest:

BRUCE LEHMAN

Attesting Officer   Commissioner of Patents and Trademarks